INVENTORS
FRANK S. KASPER
LEONARD LAMIN
BY Warren Whitesel
ATTORNEY

Jan. 21, 1964 F. S. KASPER ETAL 3,118,973

ELECTRONICALLY CONTROLLED CROSSPOINT SWITCHES

Filed July 13, 1959 4 Sheets-Sheet 2

3,118,973

ELECTRONICALLY CONTROLLED CROSSPOINT SWITCHES

Frank S. Kasper, Oak Lawn, and Leonard Lamin, Chicago, Ill., assignors to International Telephone and Telegraph Corporation, New York, N.Y., a corporation of Maryland Filed July 13, 1959, Ser. No. 826,805
14 Claims. (Cl. 179—18)

This invention relates to electronically controlled crosspoint matrices and more particularly to switches for use in such matrices.

Reference is made to a co-pending application S.N. 837,400, filed September 1, 1959, by A. J. Radcliffe, Jr., and T. A. Pickering, entitled "Electronic Switching Telephone System," assigned to the assignee of the subject case. Some of the features shown herein are claimed in Radcliffe et al.

It is old to provide electromechanical devices for selectively making particular connections responsive to an operation of vertical and horizontal members which close contacts at crosspoints. The limitations of such electromechanical devices are that the weight and inertia of moving parts tend to present an inherent barrier to prevent further development thereof. In order to surpass the limitations of electromechanical systems, attempts have been made to provide switching devices utilizing electronic circuit elements. One of the difficulties which has been encountered is a lack of electronic elements that provide reliably controlled, low distortion, low loss circuit connections over a wide range of temperatures while maintaining excellent electrical isolation when a circuit is open.

Therefore, an object of this invention is to provide new and improved electronically controlled crosspoint switches.

Another object of this invention is to provide crosspoint matrices using only electronic components.

Still another object of this invention is to provide electronically controlled cross-point matrices having a memory circuit at each crosspoint.

Yet another object of this invention is to provide simple, low power consumption, crosspoint switches with a minimum number of components.

In accordance with this invention a plurality of vertical and horizontal multiples are arranged to provide intersecting crosspoints. Each multiple includes switching and control conductors. Each crosspoint includes electronic switch means which effectively interconnects the switching conductors that interesect at such crosspoint when the electronic switch means is turned-on. Each crosspoint also includes a memory or control device which is controlled responsive to a coincidence of signals on the control conductors that intersect at such crosspoint. The memory or control device is coupled to turn-off or turn-on the electronic switch means at such crosspoint, to "remember" whether the switch is "off" or "on," and to control it accordingly.

The above mentioned and other objects of this invention together with the manner of obtaining them will become more apparent and the invention itself will be best understood by making reference to the following description of an embodiment of the invention taken in conjunction with the accompanying drawings in which:

FIGS. 1A and 1B (when properly joined with FIG. 1A on the left) show a telephone system adapted to use the subject invention;

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the accompanying drawings show memory circuits using unijunctional transistors and thyristors; whereas, magnetic cores having square hysteresis loop characteristics and other devices may be used also. In a similar manner, the crosspoint switches are shown in association with a telephone system; whereas, the matrix may be used to switch any electrical circuits, such as automatic controls for machine tools. Many items which are familiar to those skilled in the art are shown by hollow boxes to illustrate how the subject invention may be connected into a telephone system. For example, those skilled in the art know that an allotter is a device such as a chain of counting elements, a rotary switch or the like which searches for and then enables idle equipment. Quite obviously, other examples could be selected to illustrate the manner in which a wide range of equivalents should be given.

Figure 1A:
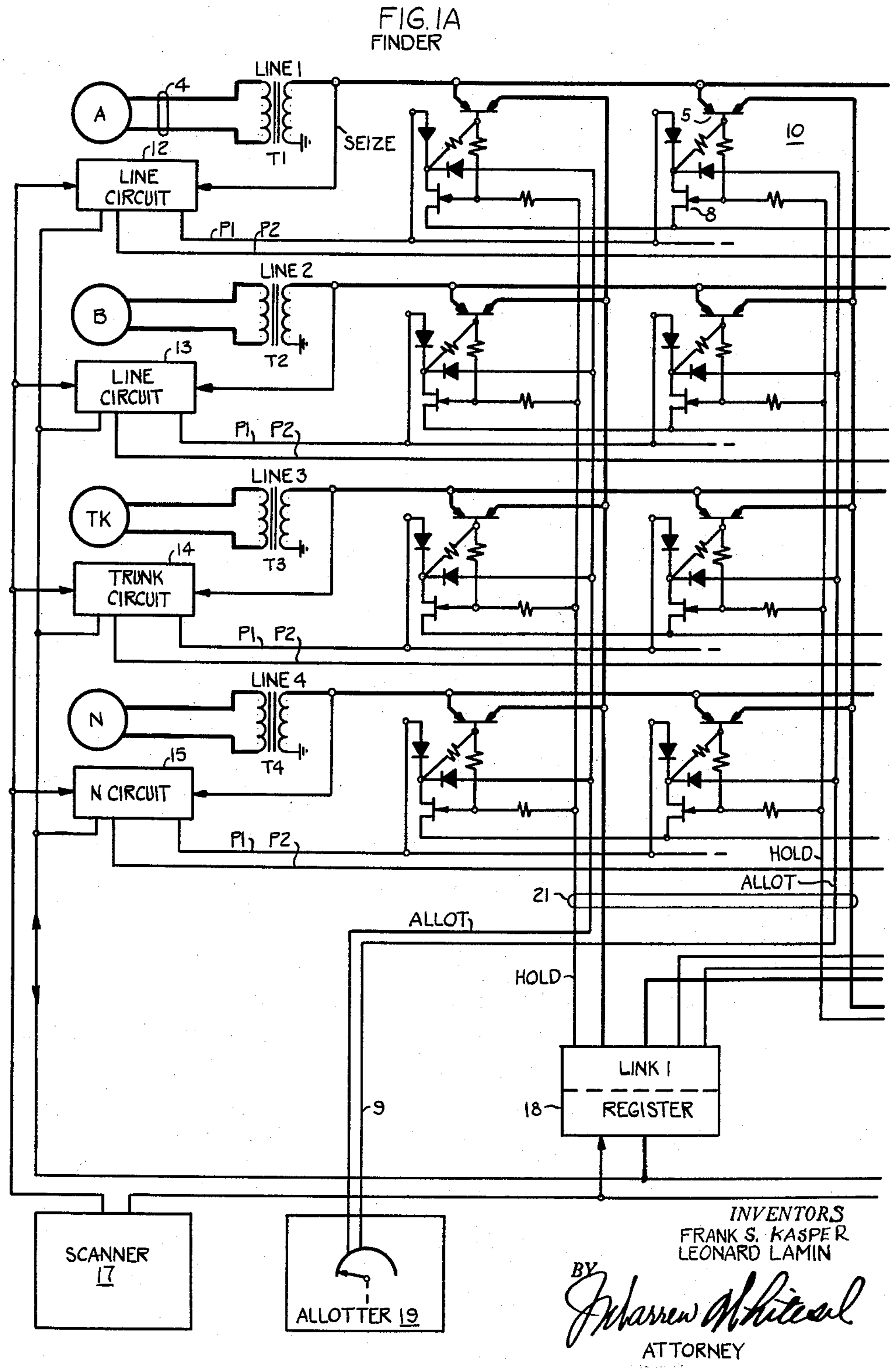
Figures 1B, 2:
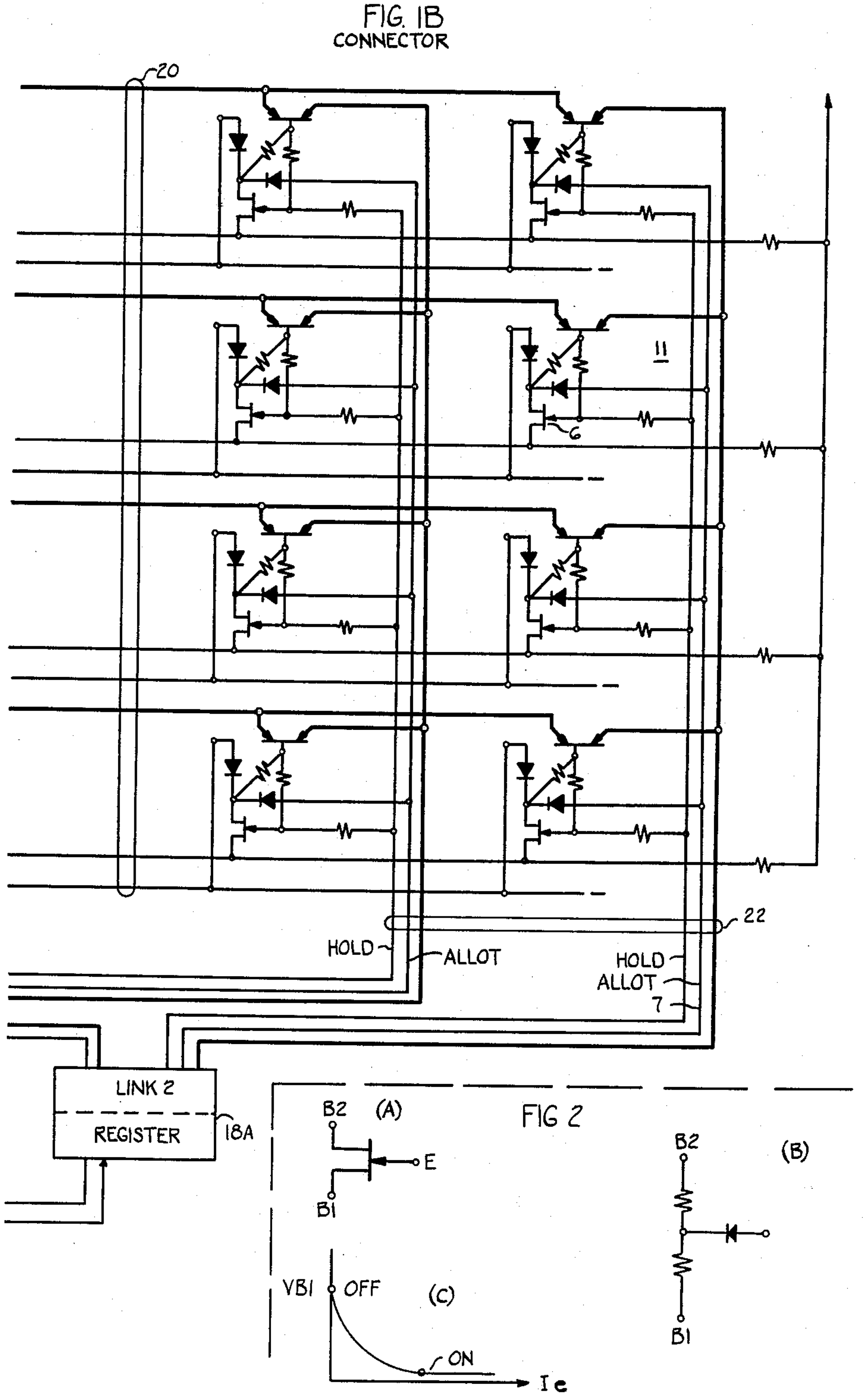
FIG. 2 is provided to help explain the characteristics of a unijunction transistor.

FIGS. 1A and 1B illustrate a basic switching system made in accordance with the subject invention. Briefly, the finder matrix of FIG. 1A includes two vertical multiples 21 and the connector matrix of FIG. 1B includes two vertical multiples 22 which are intersected by horizontal multiple 20. At each intersection (10 for example) there is an electronic switch and memory circuit which is explained hereinafter in greater detail.

The particular embodiment of FIGS. 1A and 1B includes a telephone system having two subscriber lines A and B, and a trunk line TK. The line marked N is shown to illustrate the fact that any suitable number of lines may be provided and that circuits other than subscriber and trunk lines may be accommodated. Each of the lines A, B, TK, and N is connected to an individual circuit 12–15 which is adapted to respond in any suitable manner (not shown) to calling signals extended over a conductor such as that marked "SEIZE." Scanner 17 is a clock-like device that provides a plurality of time slots each of which identifies a single line such as A, B, TK, and N.

The matrices comprising first or vertical multiples 21 and 22 are marked "finder" and "connector" respectively. Finder multiples 21 are selectively and individually marked by allotter 19 to assign an idle link to serve the next call. Line or trunk circuits 12–15 selectively mark second or horizontal multiples 20 via private or "P1" conductors in accordance with the identity of the calling line and via other private or "P2" conductors in accordance with the identity of called lines. Responsive thereto, crosspoints are operated or fired at a point (point 10, for example) in the finder matrix where the P1 marking and allotted link marking coincide and at a point (point 11, for example) in the connector matrix where the P2 marking and allotted link marking coincide.

Links 18 and 18A are devices of any suitable design which are adapted to prepare and control a vertical connector multiple 22 and to control the release of a connection at the end of a call. Registers associated with link circuits 18 and 18A are operative to receive and store subscriber transmitted switch directing signals such as digital information, for example. While the registers are shown as part of a link which is individual to a particular vertical, it should be understood that a register may also be common to a plurality of verticals.

Prior to the initiation of a call, allotter 19 allots any suitable idle vertical finder multiple and an associated link. It is assumed for the purpose of this description that link 1 is busy and that link 2 has been allotted by any suitable marking applied to conductor 9. Therefore, link 2 is prepared to receive a call that is about to be described.

To initiate a call, a subscriber at station A closes hookswitch contacts (not shown) in any suitable manner as by removing a handset, for example. Scanner 17 is periodically and sequentially enabling line circuits 12, 13, 14, 15, etc. When subscriber station A is off-hook, and the next time that scanner 17 enables line circuit 12, a signal is transmitted from line circuit 12 over associated private or sleeve conductor P1 and a horizontal element of multiple 20 through the various finder vertical multiples 21. Since it is assumed that allotter 19 has prepared the vertical multiple of link 2, there is a coincidence between a marked "P" conductor and an "ALLOT" conductor at crosspoint 10 which is, therefore, rendered conductive in a manner explained below. A "memory" device 8 associated with crosspoint 10 controls the maintenance of such conductivity until a release signal is returned from link 18A at the time of disconnect.

Dial tone may be returned in any suitable manner (not shown). Next, the calling subscriber at station A transmits called line identifying digit information to a register in the associated link 18A. Responsive thereto, a signal is transmitted from the register to the called line circuit. For example, if the digit information indicates that subscriber station B is being called, a signal is transmitted from the register to line circuit 13 which responds during a time slot marked by scanner 17 by placing a signal on private or sleeve conductor P2. Since link 2 is marking a vertical multiple via conductor 7, there is a coincidence at crosspoint 11. Therefore, switching means associated with crosspoint 11 is rendered conductive. A "memory" device 6 associated with crosspoint 11 maintains such conductivity until a release signal is received by link 18A at the time of disconnect.

Subscriber station A is now telephonically connected to subscriber station B over a circuit which may be traced from station A through crosspoint 10, a vertical multiple, link 2, and crosspoint 11 to station B.

Allotter 19 may step-on to assign the next idle finder vertical multiple either as soon as link 2 locks-in or as soon as the call is completely set-up. If allotter 19 is stepped immediately after the link responds to conductivity at finder crosspoints, the connector verticals are controlled from the link. Usually the matter of whether the allotter is or is not to step-on immediately is determined by the desired speed of switching vs. the complexity of equipment.

FIG. 2 is provided to explain the characteristics of memory device 8 which is known to those skilled in the art either by the name "double-base diode" or by the name "unijunction transistor." The item of FIG. 2A is a bar of semi-conductor material, such as a silicon, having two ohmic electrodes or base connections designated B1 and B2 and an emitter or rectifying junction E. The semi-conductor material between base B1 and emitter E acts as a first resistance while the material between base B2 and emitter E acts as a second resistance, thus providing a voltage divider network, as shown in FIG. 2B. If a small voltage is applied between emitter E and base B2 there is a very large impedance across the semi-conductor material since a blocking bias is applied to the diodes. As the voltage between terminals E and B2 increase, the unijunction transistor becomes forwardly biased and current *Ie* starts flowing into the emitter.

There is a regenerative action in a unijunction transistor which causes the current across the semi-conductor material to increase, as shown in FIG. 2C. As the current increases, the resistance of the semi-conductor material appears to decrease, thus providing negative resistance characteristics which stabilize relative to current to provide a steady state "on" current that can be utilized in a memory circuit. Hence, there is one stable state when the current through emitter E is substantially zero to provide an "off" condition and there is a second stable state when the resistance between emitter E and base B2 breaks down so that there is a maximum current flow to provide an "on" condition.

Figure 3:
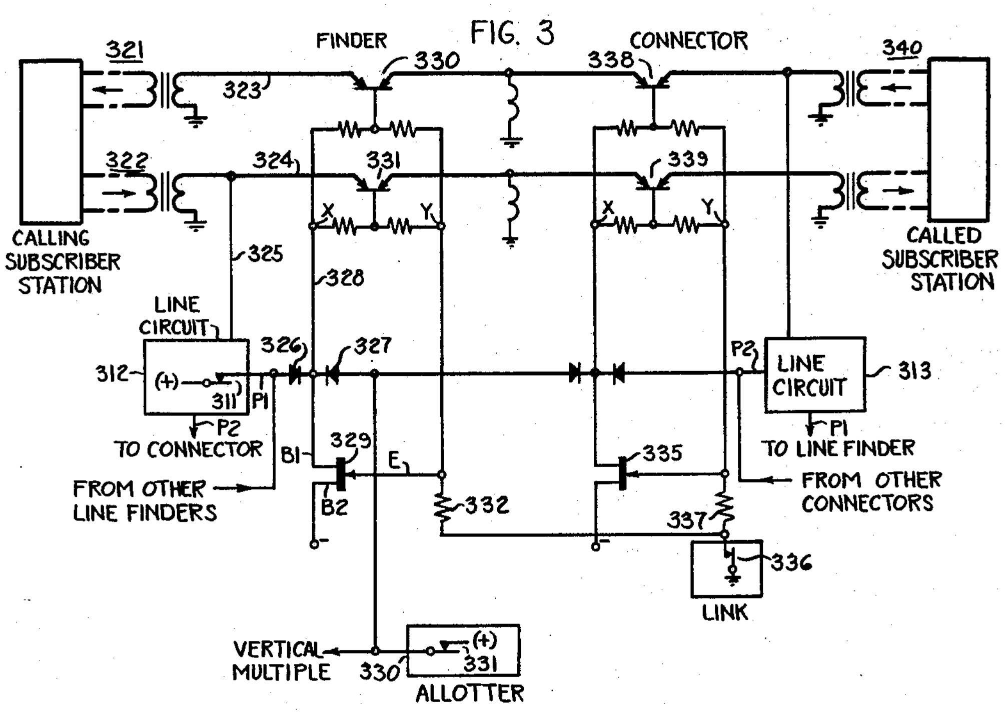
FIG. 3 shows an embodiment of the invention using bilateral transistors as switching devices and unijunctional transistors as memory devices.
Figure 4:
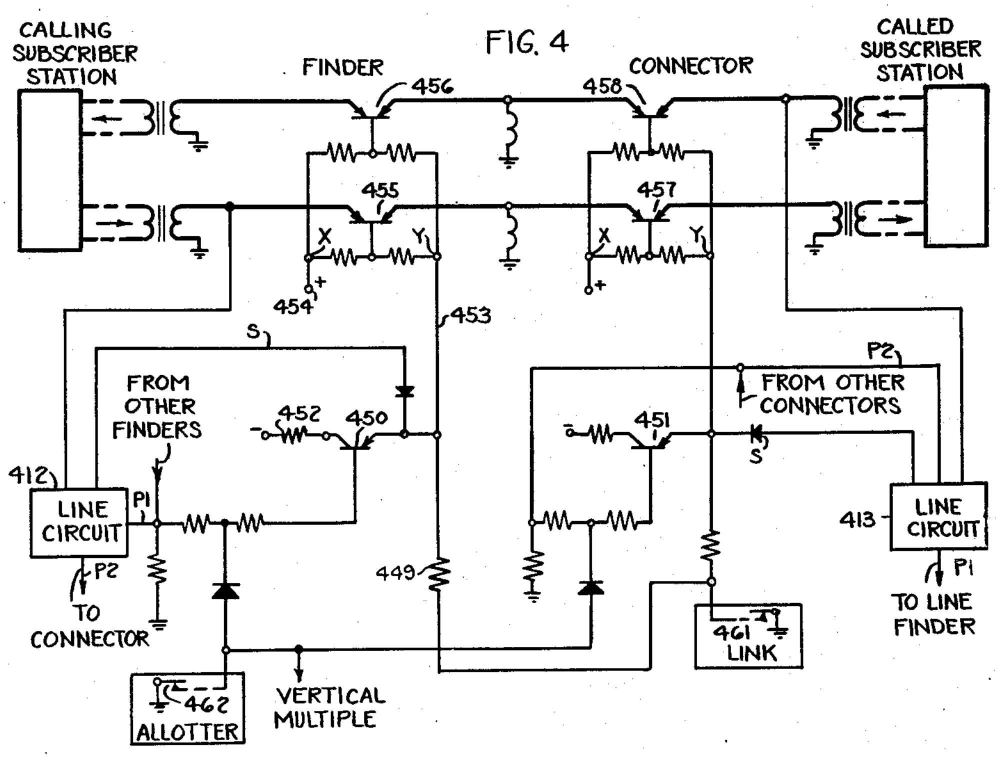
FIG. 4 shows an embodiment of the invention utilizing thyristors as memory units.
Figure 6:
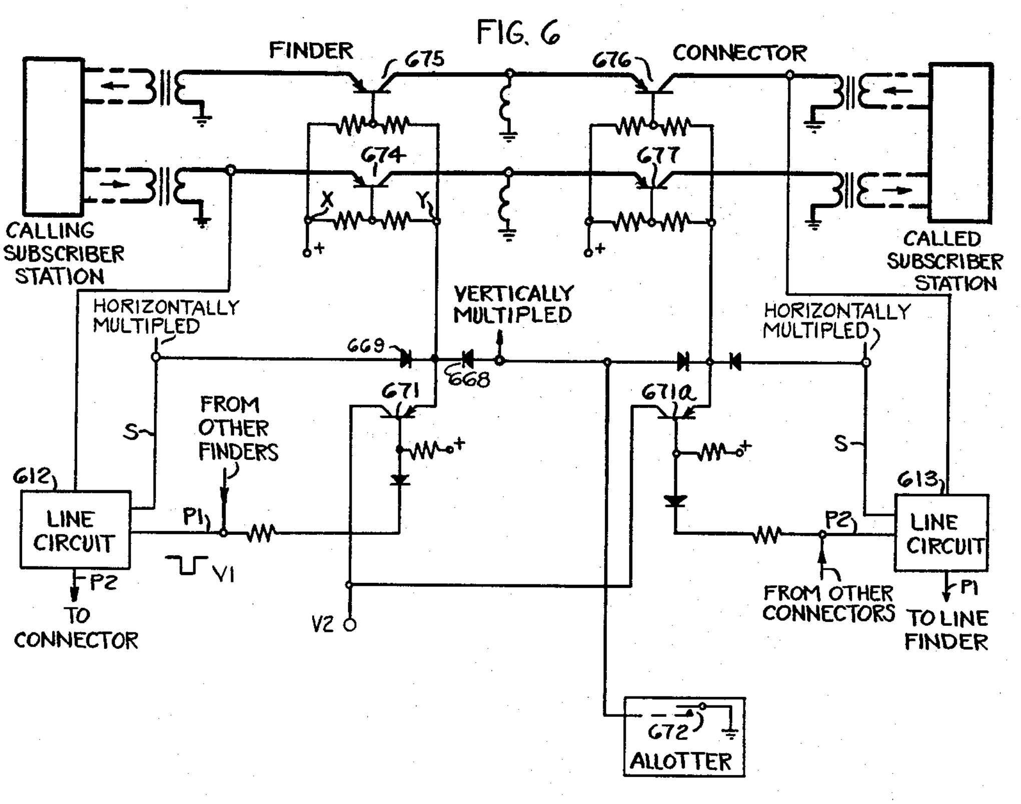
FIG. 6 shows another embodiment of the invention utilizing thyristors as memory units.

FIG. 3, which shows the details of one embodiment of a crosspoint switch, may be related to FIG. 1 in the following manner. FIG. 1 illustrates a plurality of horizontal multiples each having private conductors labeled P1 and P2. In FIG. 3, a single horizontal private conductor P1 extends from contacts 311 to diode 326, the legend reading "from other linefinders" indicating that line circuit 312 connects horizontally via conductor P1 to each finder link in the system. Private conductor P2 connects in a similar manner. In FIG. 1 each subscriber station is provided with two wires that connect into the matrix while FIGS. 3, 4, and 6 show four talking conductors, such as 321 and 322, which connect with the matrix. The upper pair of conductors 321 connect to a receiver of a subscriber's handset and the lower pair of conductors 322 connect to a transmitter of a subscriber handset. Line circuit 12, allotter 19 and link 18 are shown as contacts 311, 331 and 336 respectively. While relay contacts are shown to facilitate a description of the circuit it should be understood that any switching means may be used such as transistors, magnetic cores, gas tubes, etc. Both FIG. 1 and FIG. 3 illustrate an embodiment of the invention wherein an electronic crosspoint utilizes a unijunction transistor 329, such as explained above, as a memory unit and bilateral transistors 330 and 331 as switches for voice currents. Bilateral transistors are described in an article entitled "Transistor Bilateral Switches," by Wm. M. Cook and Pier L. Bargellini, which appeared in the July-October 1958 issues of the magazine Semiconductor Products. A bilateral transistor, such as items 330 and 331, has interchangeable emitter-collector electrodes and one base electrode. The characteristics of a bilateral transistor are such that it offers an extremely high impedance when not conducting and an extremely low impedance when conducting.

In FIG. 3, the unijunction transistor is turned-on by first applying a positive potential to base B1 thereby establishing a potential gradient across the semi-conductor material. A subsequent interruption of the positive bias at base B1 causes current to flow from ground through contacts 336, resistor 332, emitter E and base B2 to negative battery. An interruption, as at contacts 336, of the circuit including emitter E turns the unijunction transistor "off".

Normally, contacts 331 in allotter 330 apply a positive potential through diode 327 and in parallel therewith contacts 311 in line circuit 312 apply a similar positive potential through diode 326. When the link is allotted, a positive potential is removed from unijunction transistor 329 at contacts 331. When a call is initiated and line circuit 312 responds to an off-hook seizure signal, positive potential is removed from conductor P1 by contacts 311.

When contacts 311 and 331 open to remove the positive potentials, current begins to flow in the circuit including ground at contacts 336, resistance 332, emitter E, and base B2 to a negative potential. Unijunction transistor 329 is changed to its second stable or "on" state. The characteristics of transistor 329 are such that it continues to conduct after positive potential is reapplied at contacts 331 and 311.

Prior to the off-hook condition, a signal is extended from positive voltage at contacts 311 and 331 through diodes 326 and 327, points X and Y, and resistor 332 to ground at contacts 336. The bias at the base electrodes of transistors 330 and 331 is sufficient to turn-off bilateral transistors 330 and 331. After the off-hook condition, current flowing from negative voltage on base B2 through conductive transistor 329, emitter E and resistor 332 to ground at contacts 336 causes a negative potential to appear at point Y. Therefore, the signal applied to the base electrodes of transistors 330 and 331 cause them to fire thereby rendering the crosspoint conductive and telephonically intercoupling the calling and called subscriber stations.

The calling subscriber receives dial tone which is sent in any suitable manner (not shown). Responsive thereto, digit information is transmitted to control a register in a link such as in item 18A (FIG. 1) in accordance with the directory number of the called subscriber. Responsive to the numerical value of such digit informatio, called line circuit 313 (FIG. 3) removes a positive potential from conductor P2. The connector crosspoint is controlled in the manner described above in connection with the finder. Thereupon transistors 338 and 339 conduct to interconnect the calling and called stations.

At the end of a call the conversing subscribers return their receivers or handsets to an on-hook position, whereupon means (not shown) causes contacts 336 to open momentarily, thereby breaking the circuit through emitter E. When the circuit including emitter E is broken, current ceases to flow through unijunction transistors 329 and 335. Points Y are no longer at the negative potential which maintains conductivity of voice switch transistors 330, 331, 338 and 339. As soon as contacts 336 reclose, ground potential is applied to points Y via a circuit extending through resistors 332 and 337, thus turning-off transistors 330, 331, 338, and 339.

Figure 5:
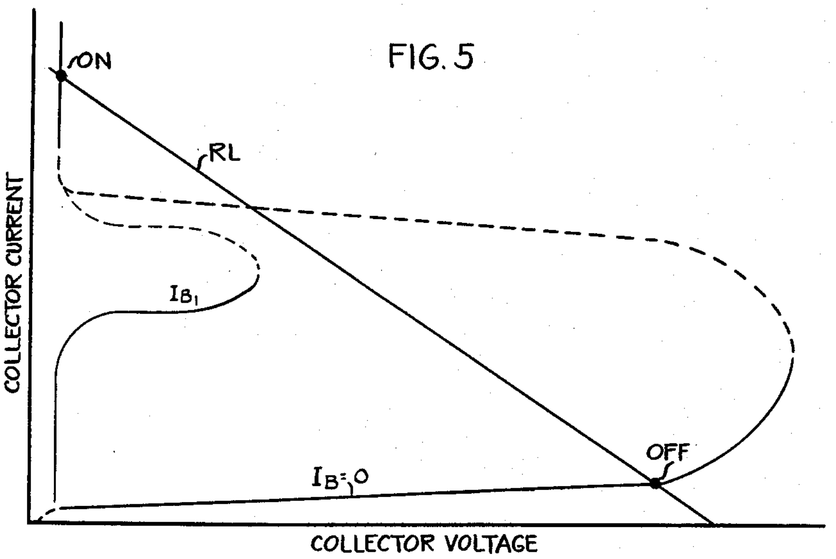
FIG. 5 shows the characteristics of a thyristor.

FIG. 4 is similar to FIG. 3 except that a memory device is provided in the form of thyristors 450 and 451. A thyristor is a bi-stable germanium transistor with regenerative characteristics as shown in FIG. 5. In the "off" condition as indicated in FIG. 5, there is virtually no collector current flow whereas in the "on" condition there is substantial collector current flow. The thyristor may be switched from its "off" state to its "on" state by applying a base current wherein $I_B$ is greater than $I_{B1}$. The thyristor displays a negative resistance characteristic in the portion of the curve of FIG. 5 which is indicated by dotted lines. Thereafter, the thyristor assumes a second stable condition as indicated in FIG. 5 by the notation "on". A thyristor will remain in the "on" state even after the base current is $I_B$ equals zero.

Referring to FIG. 4 in greater detail, crosspoints are shown as bilateral transistors 455–458. The vertical multiples are allotted when contacts 462 open. The horizontal multiples are marked by a potential applied to the P conductors, as when line circuit 412 responds to a calling signal, for example. A coincidence of an allotted vertical and a marked horizontal causes a particular crosspoint to become conductive. The markings applied to the P conductors are not effective at non-allotted crosspoints since they are shunted to ground as at closed contacts 462, for example.

Prior to the calling condition a circuit may be traced from positive potential at point 454 through points X and Y, conductor 453, resistance 449 and contacts 461 to ground. Responsive to the calling condition, a potential is applied to conductor P1 and the base of thyristor 450 which is switched "on". Current begins to flow over a circuit extending from negative battery through resistance 452, thyristor 450, resistance 449 and contacts 461 to ground. Responsive to the current flow through thyristor 450, the bias at point Y is such that transistors 455 and 456 are switched "on" to intercouple the heavily inked talking conductors. Conductor "S" provides means for returning a signal responsive to the output of thyristor 450 to provide any supervisory functions which are required when a finder crosspoint fires and further to step allotter 462 when required.

Any suitable register equipment, such as a part of link 2 (FIG. 1), for example, is adapted to receive and store subscriber transmitted digit information. In accordance with such digit information, a marking is extended over conductor P2 from called line circuit 413. Again, contacts 462 are closed at all except the allotted vertical so that signals on conductor P2 are shunted to ground at all except the allotted link. The potential applied to the base electrode of thyristor 451 causes it to conduct. Responsive thereto, the negative potential at point Y is such that transistors 457 and 458 are switched-on. Thus, a calling subscriber station is telephonically connected to a called subscriber station. Conversation follows.

At the end of the conversation, any suitable means (not shown) responds to on-hook supervision momentarily to open contacts 461, thus causing thyristors 450 and 451 to cut-off. Transistors 455–458 cease conducting and are biased to an "off" condition by positive potential applied at the points marked by the letter "X".

FIG. 6 illustrates a telephone system which also uses a crosspoint memory device in the form of thyristors—a device which is explained above in connection with FIG. 5. However, FIG. 6 is designed to require relatively small trigger power and to provide automatic lockout. Normally, contacts 672 are opened. When the vertical multiple is allotted, contacts 672 close and remain closed for the duration of the call. The horizontal multiples are marked by potentials applied to the P conductors.

As in the previously described circuits, a calling subscriber removes a receiver or handset to close an associated hookswitch and thereby send a seizure signal to line circuit 612 which responds by applying a control pulse V1 to conductor P1—the magnitude of voltage V2 is always greater than the magnitude of voltage V1. Thyristor 671 begins to conduct and potential V2 is conducted to point Y to cause transistors 674 and 675 to conduct and intercouple the heavily inked talking conductors. At the non-allotted crosspoints, all outputs of thyristors similar to 671 are blocked by diodes such as 669 and 668 which are back biased responsive to emitter current.

*Lockout.*—In greater detail, when thyristor 671 begins to conduct, a voltage which is slightly less than voltage V2 but greater than voltage V1 is applied through diode 668 to the vertical multiple to back bias diodes at other crosspoints which correspond to diode 668 and is applied through diode 669 to the horizontal multiples to back bias diodes at other crosspoints which correspond to diode 669. Since diodes similar to 669 and 668 are back biased at each crosspoint in the horizontal and vertical multiples that intersect at the subject crosspoint, all thyristors corresponding to item 671 in such intersecting multiples are blocked. Also, the appearance on conductor "S" of the voltage applied through diode 669 is a supervisory signal to the line circuit indicating that a crosspoint has closed.

As in previously described embodiments of the invention, any suitable register responds to digit information transmitted by the calling subscriber and marks the line circuit 613 associated with the called line. A potential on conductor P2 fires an associated thyristor 671*a* which thereupon causes transistors 676 and 677 to conduct. A portion of each of the thyristors output signals is fed back to the line circuits 612 and 613 via conductor S; whereupon, the allotter closes other contacts similar to 672, thus assigning another vertical multiple to serve the next call. Transistors 674–677 continue to conduct for the duration of a call after which any suitable means in an associated link responds to on-hook signals by opening contacts 672 thereby breaking the circuits through emitters of thyristors 671 and 671*a*, thus turning them "off."

While the principles of the invention have been described in connection with specific apparatus, it is to be clearly understood that this description is made only by way of example and not as a limitation on the scope of the invention.

We claim:

1. A matrix comprising first and second multiples connected to provide intersecting crosspoints, each of said multiples comprising signal carrying lines and control conductors, each of said crosspoints comprising memory means coupled to said control conductors and at least one bilateral transistor for selectively intercoupling said signal carrying lines, allotter means for selectively marking idle control conductors associated with said first multiples, means for selectively marking said control conductors associated with said second multiples in accordance with the identity of those of said signal carrying lines which are to be switched, means jointly responsive to said marked control conductors for causing one of said transistors at a particular crosspoint to electrically intercouple said signal carrying lines which intersect at said particular crosspoint, and means for causing said memory means at said particular crosspoint to hold said electrical intercoupling.

2. The matrix of claim 1 and lock-out means controlled by said memory means at said particular crosspoint for preventing said electrical intercoupling at all other of said crosspoints in said first and second multiples which intersect at said particular crosspoint.

3. The matrix of claim 1 wherein each of said memory means comprises a bi-stable element including a bar of semi-conductive material having first and second ohmic electrodes at space point thereon and a junction electrode intermediate said ohmic electrodes, said semi-conductive material normally being in a first stable state, means responsive to signals applied to at least one of said electrodes for biasing said semi-conductive material to a second stable state.

4. A matrix comprising first and second multiples connected to provide intersecting crosspoints, each of said multiples comprising signal carrying and control conductors, each of said crosspoints comprising memory means including a thyristor coupled to said control conductors and at least one bilateral transistor for selectively intercoupling said signal carrying conductors, allotter means for selectively marking idle control conductors associated with said first multiples, means for selectively marking said control conductors associated with said second multiples in accordance with the identity of those of said signal carrying conductors which are to be switched, means jointly responsive to said marked control conductors for causing one of said transistors at a particular crosspoint to electrically intercouple said signal carrying conductors which intersect at said particular crosspoint, and means for causing said memory means at said particular crosspoint to hold said one transistor and maintain said electrical intercoupling.

5. A matrix comprising first and second multiples connected to provide intersecting crosspoints, switching means connected to control the transmission of signals through each of said crosspoints, memory means at each of said crosspoints, means for controlling said memory means responsive to a coincidence of first and second multiple signals at said crosspoints, and means responsive to said last named means for causing said switching means to pass signals through said crosspoints.

6. The matrix of claim 5 and lock-out means controlled by said memory means for preventing an operation of said switching means at any of said crosspoints in said first and second multiples which intersect at said particular crosspoint.

7. A matrix comprising first and second multiples connected to provide intersecting crosspoints, each of said multiples comprising switching conductors and control conductors, switching means at each of said crosspoints, each of said switching means comprising a bilateral transistor having a first condition wherein current flows at a relatively low rate through said transistor and a second condition wherein current flows at a relatively high rate through said transistor, means for connecting at least one of said bilateral transistors at each of said crosspoints to conduct current between said switching conductors which intersect at said each crosspoint when said bilateral transistor is in said second condition, and memory means at each of said crosspoints connected to be controlled by a coincidence of signals extended over said control conductors associated with said first and with said second multiples.

8. The matrix of claim 7 and lock-out means controlled by said memory means for preventing an operation of said switching means at any of said crosspoints in said first and second multiples which intersect at a conductive crosspoint.

9. A switching matrix comprising first and second multiples arranged to provide intersecting crosspoints, each of said crosspoints comprising switching means and memory means, each of said memory means comprising a bi-stable element having a control electrode, said bi-stable elements being switched between two stable states responsive to signals applied to said control electrodes, allotting means for selectively marking said control electrodes of all of said memory means associated with a particular one of said first multiples, means for selecting a particular one of said second multiples, means responsive to said last named means for causing a particular one of said bi-stable elements in said particular first multiple to transmit an output signal, and means responsive to said output signal for operating a particular one of said switching means.

10. The matrix of claim 9 and lock-out means controlled by said memory means for blocking the operation of said switching means at all of said crosspoints in said first and second multiples which include said particular switching means.

11. A switching matrix comprising first and second multiples arranged to provide intersecting crosspoints, each of said crosspoints comprising switching means and memory means, each of said memory means comprising a thyristor having a control electrode, said thyristor being switched between two stable states responsive to signals applied to said control electrodes, allotting means for selectively marking said control electrodes of all of said memory means associated with a particular one of said first multiples, means for selecting a particular one of said second multiples, means responsive to said last named means for causing a particular one of said thyristors in said particular first multiple to transmit an output signal, and means responsive to said output signal for operating a particular one of said switching means.

12. The matrix of claim 9 wherein each of said memory means comprises a bar of semi-conductive material having first and second ohmic electrodes at space points thereon and a junction electrode intermediate said ohmic electrodes, said semi-conductive material normally being in a first stable conductive state, means responsive to signals applied between said junction electrode and one of said ohmic electrodes for biasing said semi-conductive material to a second of its stable states, and said means for operating said switching means comprises signals transmitted when said semi-conductive material is in said second stable state.

13. A plurality of electronic switches each comprising, at least two signal carrying lines, means comprising at least one bilateral transistor at each of said switches coupled to pass signals between said lines when said coupled transistor is conductive, means comprising a control electrode associated with each of said transistors for switching said associated transistor between conductive and non-conductive states, memory means comprising a bi-stable semi-conductor element connected to control signals applied to said control electrode of an individually associated one of said transistors, means comprising a plurality of diodes for applying control signals to switch said semi-conductor between its two stable states, and means responsive to switching said semi-conductor to one stable state for back biasing said diodes associated with semi-conductors at other of said electronic switches to lock-out said memory means thereat.

14. A plurality of electronic switches, each comprising at least two signal carrying lines, switching means comprising at least one bilateral transistor at each of said electronic switches coupled to pass signals between said lines when said transistor is conducting, each of said switching means also comprising a bistable semi-conductor connected to be controlled over a conductor which is common to a plurality of semi-conductors associated with other of said electronic switches, means for transmitting signals over said conductor to prepare a plurality of said semi-conductors, means for applying control potentials to a particular one of said prepared semi-conductors thereby causing said particular semi-conductor to switch from a first to a second of its stable states, means responsive to said switching of said particular semi-conductor to said second state for transmitting an output signal indicating that an electronic switch including said particular semi-conductor is conductive, and means responsive to said output signal for preventing other of said semi-conductors from switching.

References Cited in the file of this patent

UNITED STATES PATENTS

| | | |
|---|---|---|
| 2,739,185 | Panzerbieter et al. | Mar. 20, 1956 |
| 2,854,516 | Faulkner | Sept. 30, 1958 |
| 2,876,285 | Bjornson et al. | Mar. 3, 1959 |
| 2,892,035 | Trousdale | June 23, 1959 |
| 2,931,863 | Faulkner | Apr. 5, 1960 |